US012358179B1

(12) United States Patent
Austin et al.

(10) Patent No.: US 12,358,179 B1
(45) Date of Patent: Jul. 15, 2025

(54) REMOTE CONTROLLED TREE TRIMMER

(71) Applicants: David Frederick Austin, Hobe Sound, FL (US); Terri Austin Keogh, Hobe Sound, FL (US)

(72) Inventors: David Frederick Austin, Hobe Sound, FL (US); Terri Austin Keogh, Hobe Sound, FL (US)

( * ) Notice: Subject to any disclaimer, the term of this patent is extended or adjusted under 35 U.S.C. 154(b) by 143 days.

(21) Appl. No.: 17/977,758

(22) Filed: Oct. 31, 2022

(51) Int. Cl.
*B27L 1/08* (2006.01)

(52) U.S. Cl.
CPC .................................... *B27L 1/08* (2013.01)

(58) Field of Classification Search
CPC .......... A01G 23/0955; B27L 1/08; B27L 1/06
See application file for complete search history.

(56) References Cited

U.S. PATENT DOCUMENTS 2,612,724 A * 10/1952 Llewellyn .......... A01G 23/0955 47/1.01 R
4,624,293 A * 11/1986 Suezaki ............. A01G 23/0955 144/24.13
5,322,102 A 5/1994 Livingston
7,422,041 B2 9/2008 Smith
2009/0277536 A1* 11/2009 Scott .................. A01G 23/0955 144/24.13
2014/0060701 A1* 3/2014 Van De Mortel ......... B27L 1/06 144/343
2014/0110021 A1* 4/2014 Divine ............... A01G 23/0955 144/24.13

* cited by examiner

*Primary Examiner* — Mohammed S. Alawadi
(74) *Attorney, Agent, or Firm* — Sanchelima & Associates, P.A.; Jesus Sanchelima; Christian Sanchelima

(57) ABSTRACT

A remote-controlled tree trimmer including a climbing assembly, a cutting assembly, and a control device assembly. The climbing assembly includes a bottom ring and climbing structures. The climbing structures are attached to the bottom ring. The climbing structures move up and down said bottom ring in a trunk of a tree. The cutting assembly includes a top ring and a cutting element. The top ring is connected to the bottom ring. The top ring is above the bottom ring. The cutting element is inside the top ring. The cutting element rotates to trim slang of a tree. The control device includes a control device. The control device operates said cutting element to rotate and said climbing structures to move said bottom ring up and down.

6 Claims, 7 Drawing Sheets

REMOTE CONTROLLED TREE TRIMMER

BACKGROUND OF THE INVENTION

1. Field of the Invention

The present invention relates to a remote-controlled tree trimmer and, more particularly, to a remote-controlled tree trimmer which allows pruning a palm using a remote-control device.

2. Description of the Related Art

Several designs for trimmers have been designed in the past. None of them, however, include a remote control which is used to move the tree trimmer upwards and downwards on the trunk of a tree.

Applicant believes that a related reference corresponds to U.S. Pat. No. 5,322,102 issued for a pruning device having a helical cutting head. Applicant believes that another related reference corresponds to U.S. Pat. No. 7,422,041 issued for a tree trimming device that automatically climbs a tree or other vertical members and shears limbs or debris as it climbs. None of these references, however, teach of a tree trimming device comprising a climbing ring having an attachment clamp, multiple cutting elements, and a motor which enables the three trimmer to travel up and down a trunk while trimming the trunk of the tree.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a remote-controlled tree trimmer that includes a displacement element to move the trimmer upwards and downwards to reach the portion of the tree that needs trimming.

It is another object of this invention to provide a remote-controlled tree trimmer that includes a trimming element which rotates to make circular cuts.

It is another object of this invention to provide a remote-controlled tree trimmer that includes a plurality of hooks which aid in attaching the tree trimmer in a predetermined position on the trunk of the tree.

It is still another object of the present invention to provide a remote-controlled tree trimmer that includes a motor for propelling the trimmer, the motor being battery powered for portability.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
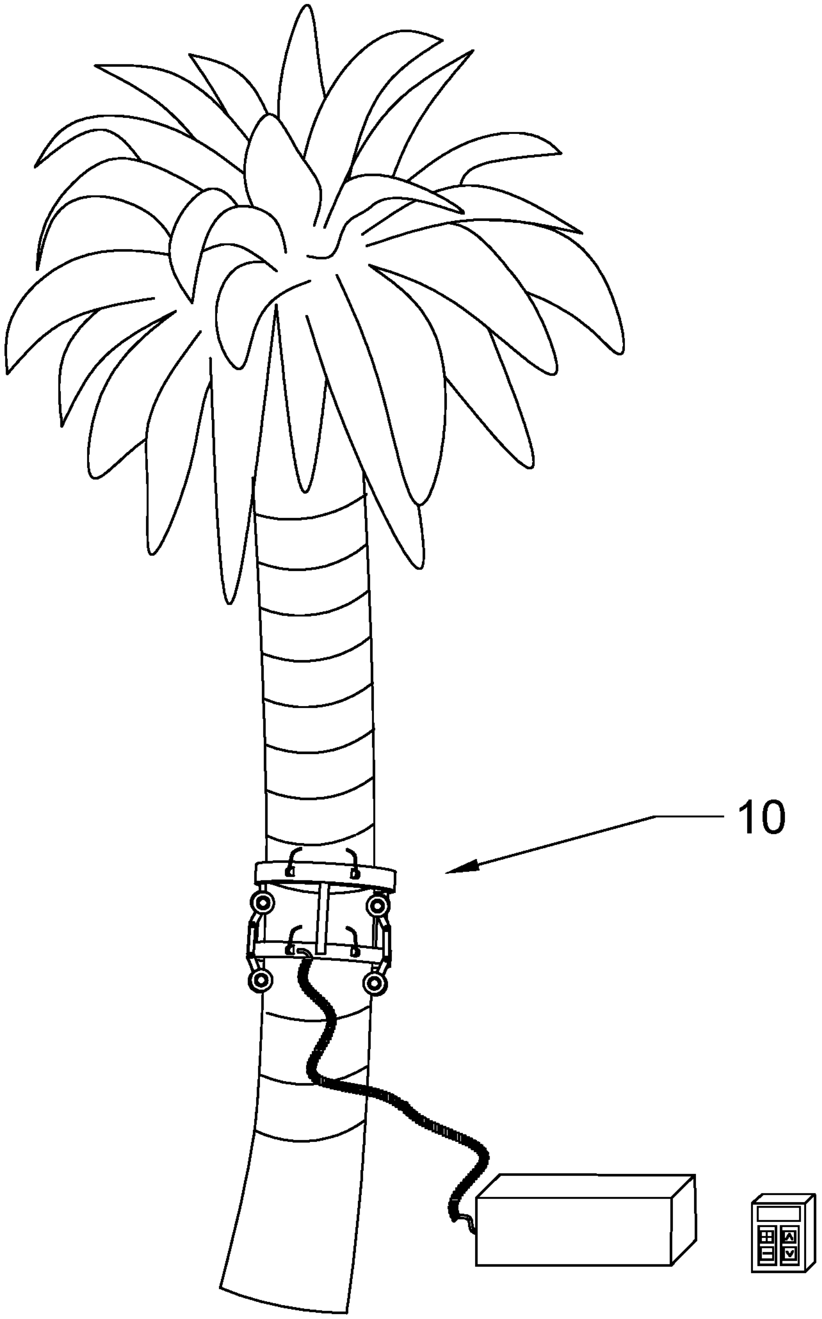
FIG. 1 represents an isometric operational view of the present invention 10.

Referring now to the drawings, where the present invention is generally referred to with numeral 10, it can be observed that it basically includes a climbing assembly 20, a cutting assembly 40, an electronic assembly 60 and a control device assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
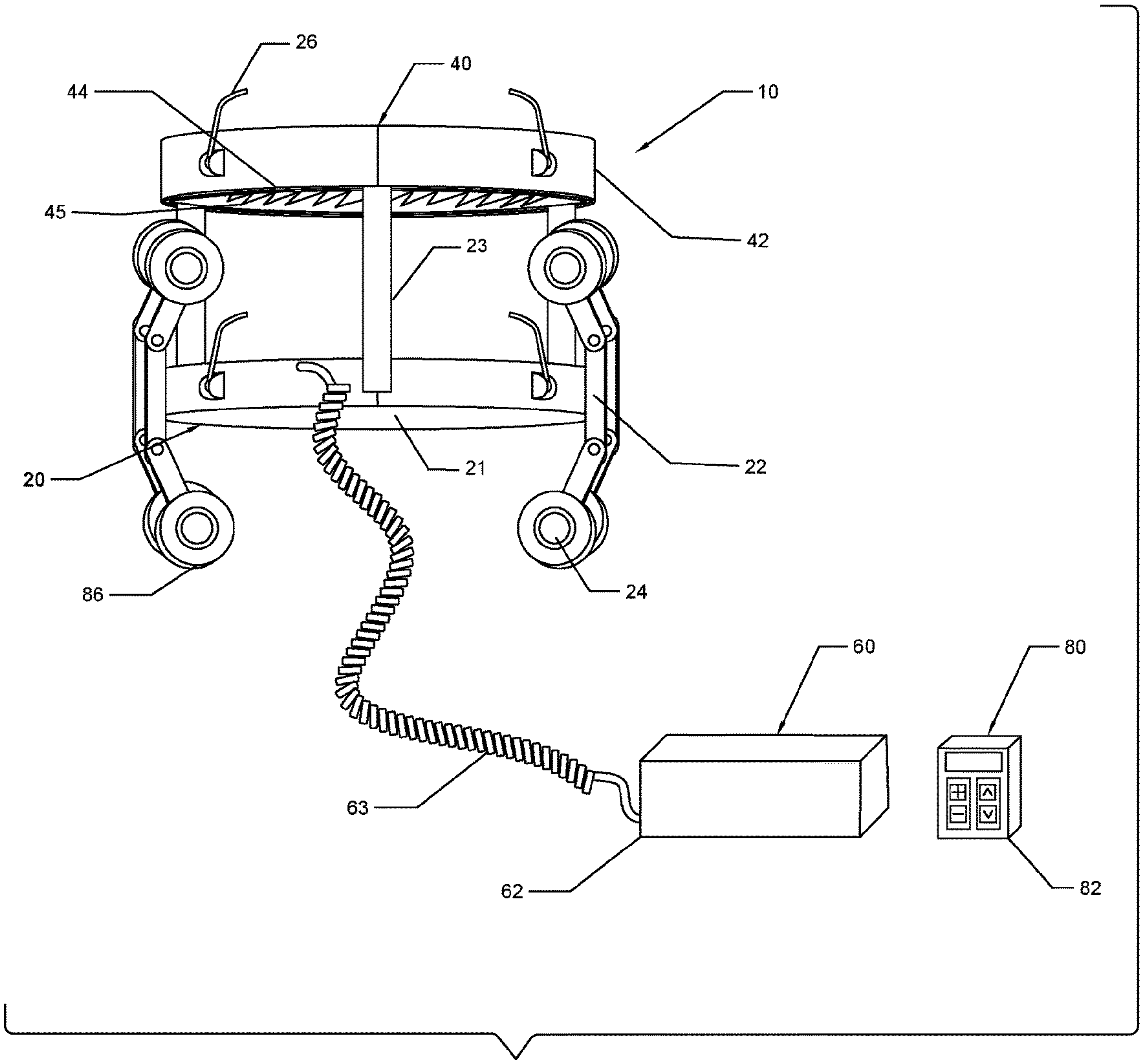
FIG. 2 shows an isometric view of the present invention 10. The present invention includes a climbing assembly 20, a cutting assembly 40, an electronic assembly 60 and a control device assembly 80.
Figure 2A:
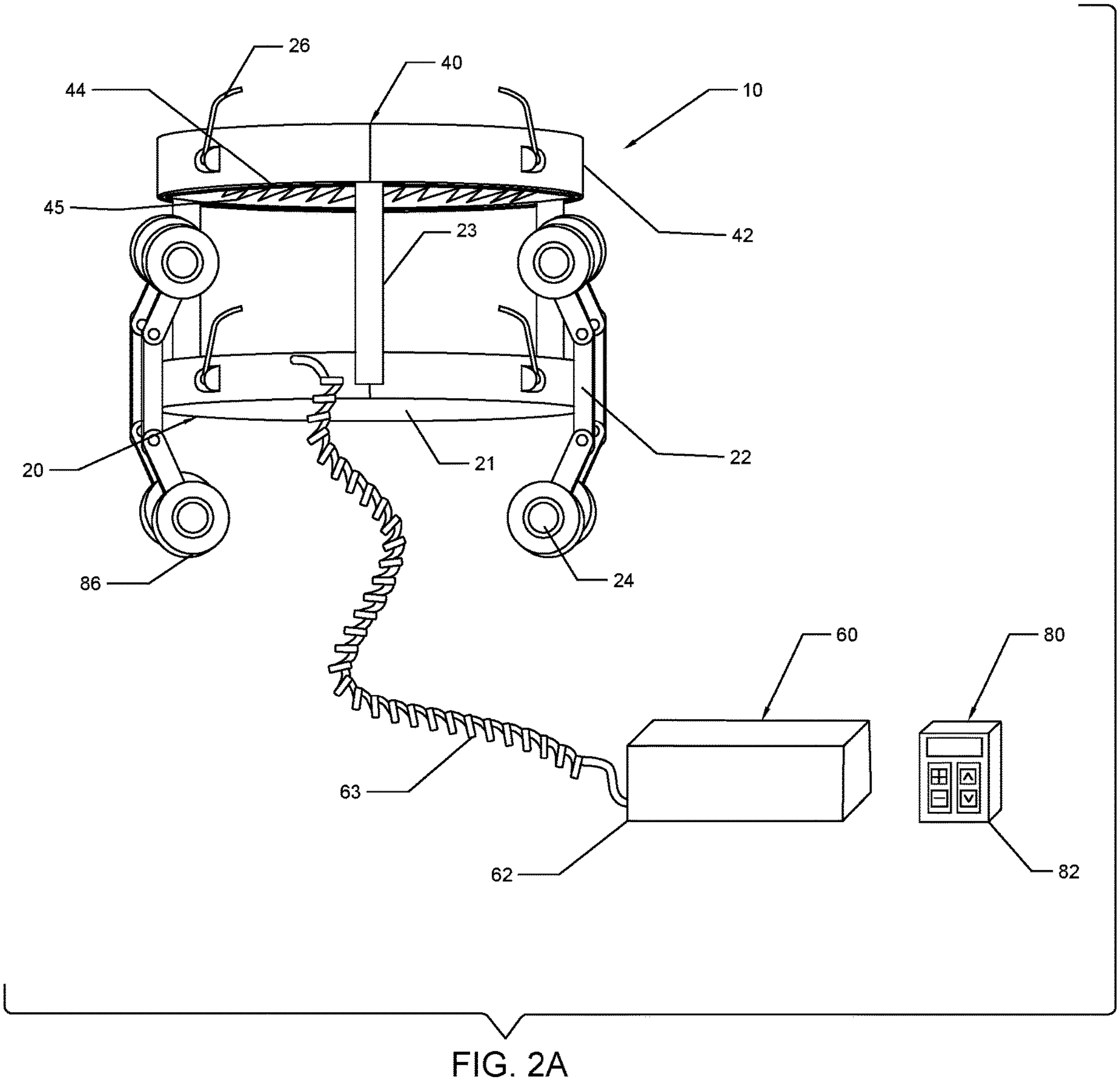
FIG. 2A depicts an isometric view of the present invention 10 having the cord 63 in an expanded configuration.
Figure 2B:
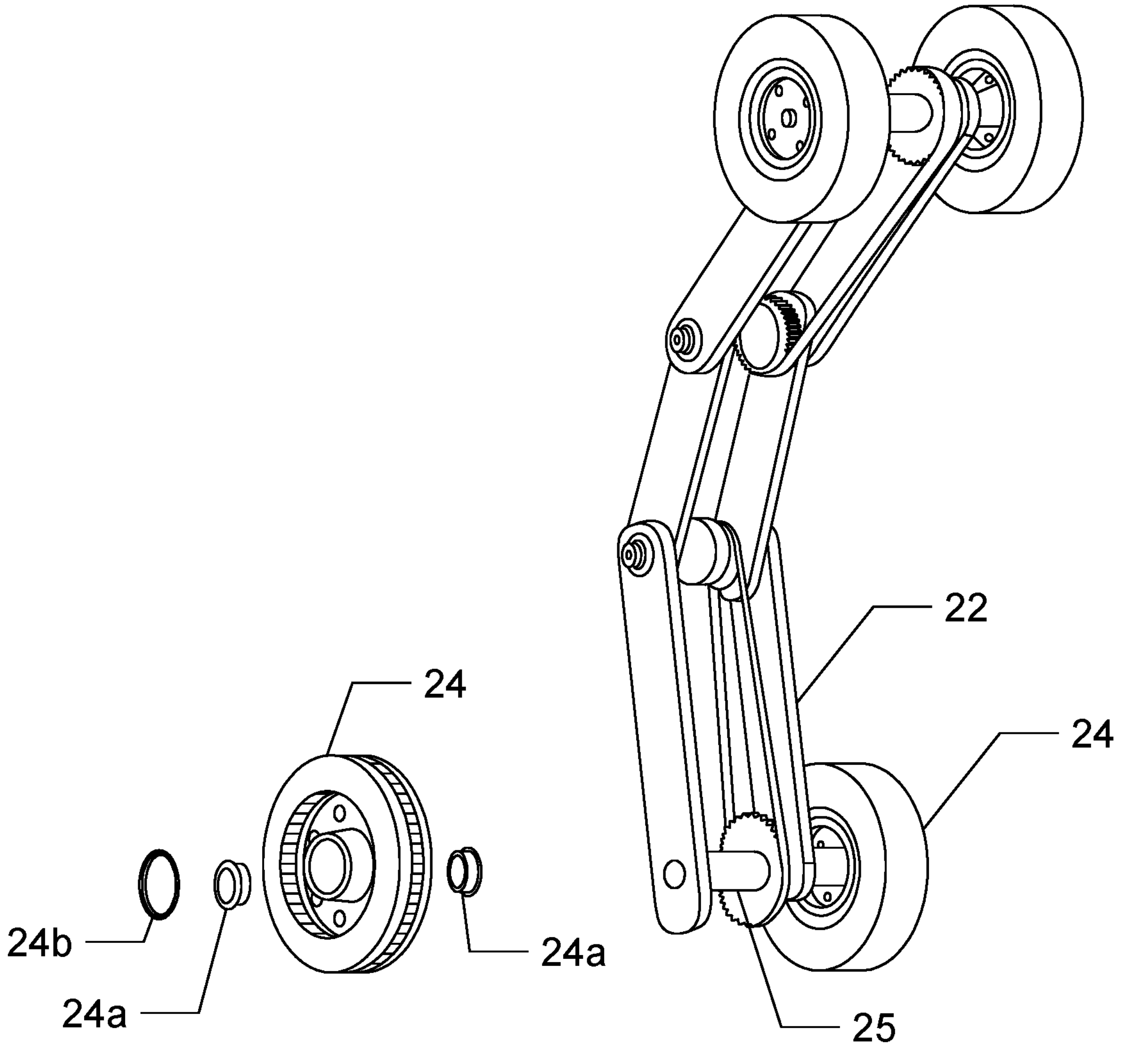
FIG. 2B shows an isometric view of the climbing structures 22.
Figure 3:
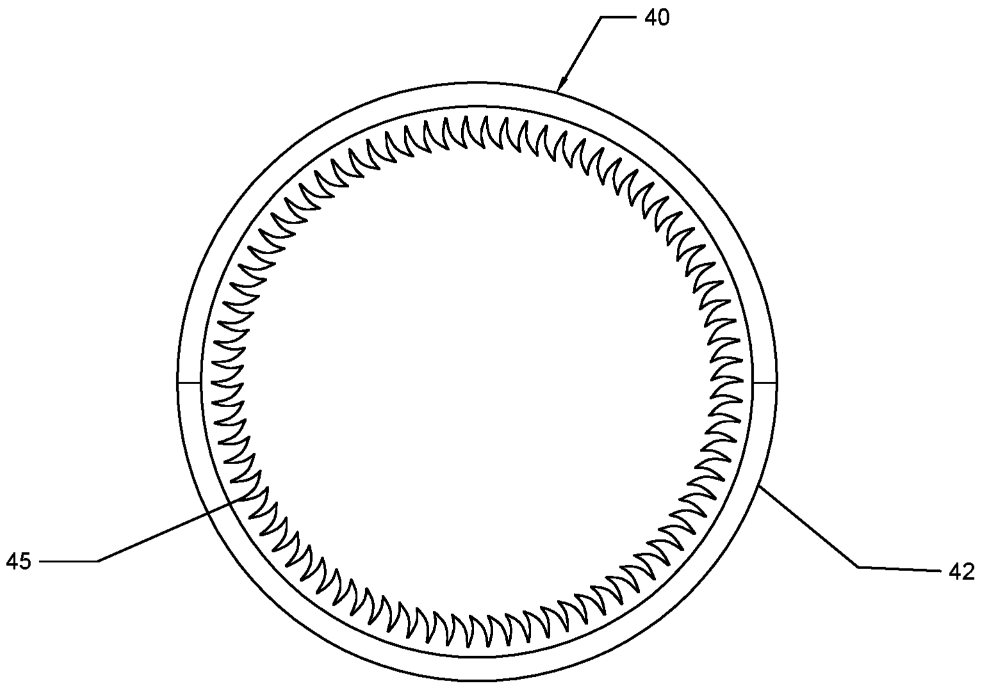
FIG. 3 illustrates a top view of the cutting assembly 40.
Figure 4:
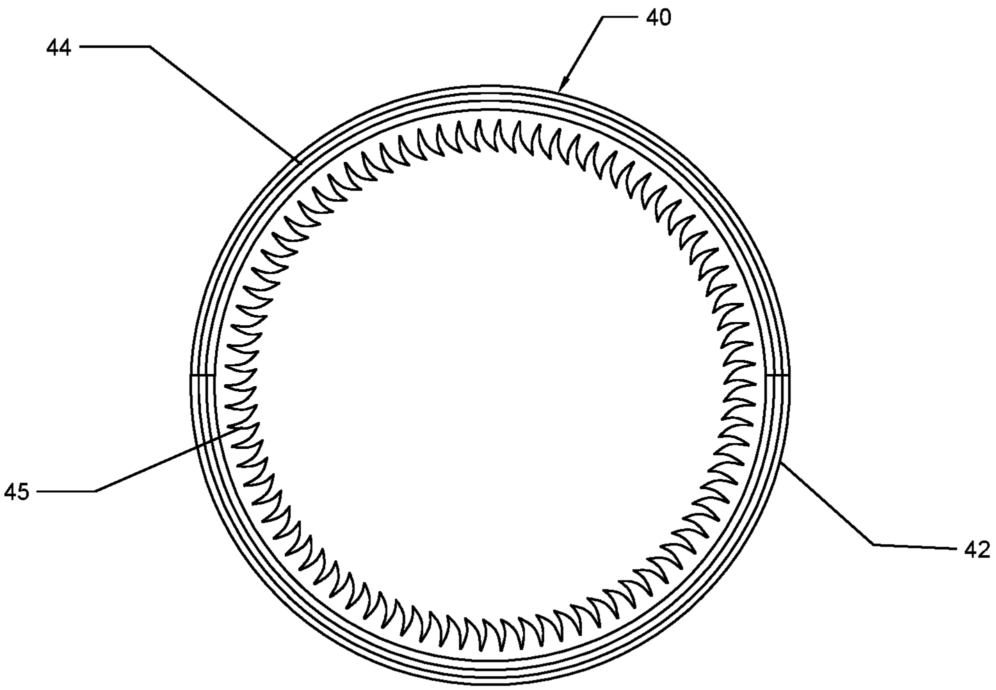
FIG. 4 is a representation of a bottom view of the cutting assembly 40.
Figure 5:
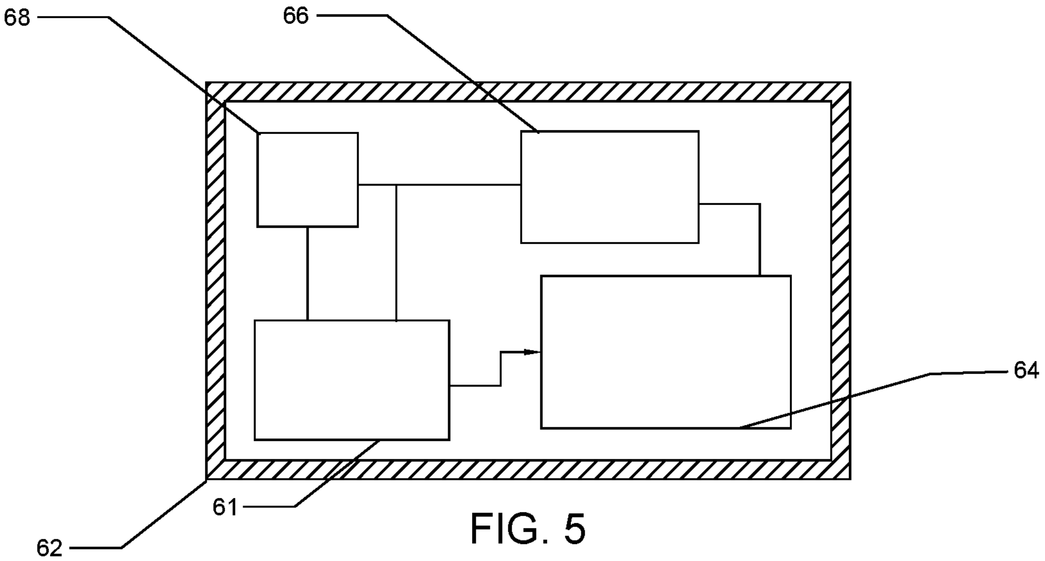
FIG. 5 illustrates a cross-sectional view of the electronic assembly 60.
Figure 6:
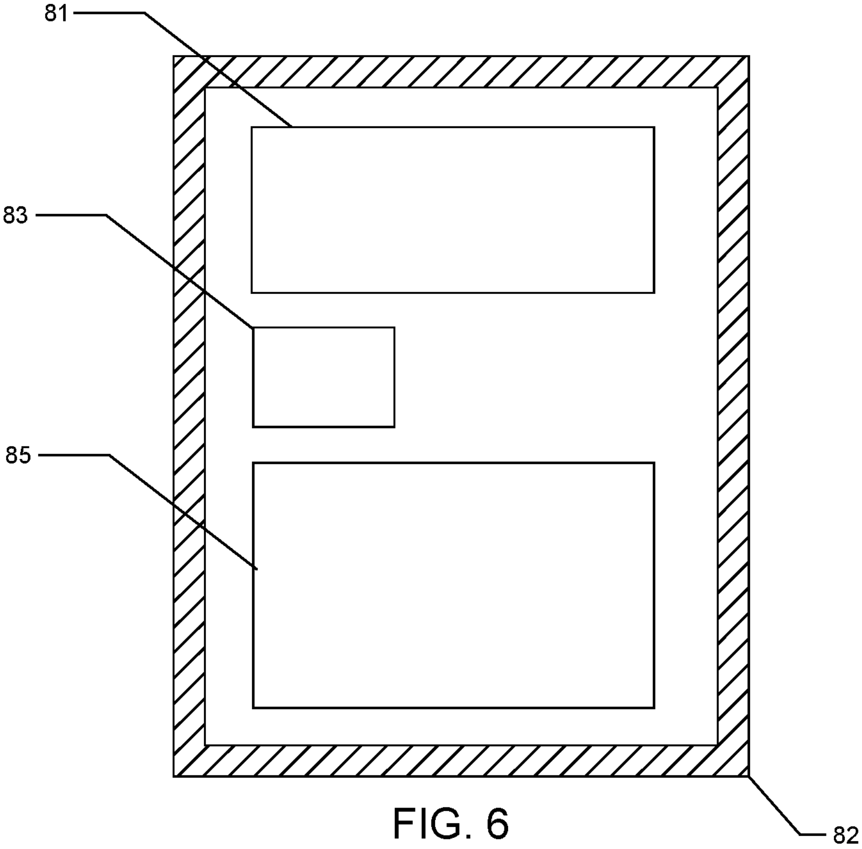
FIG. 6 shows a cross-sectional view of the control device assembly 80.
Figure 7:
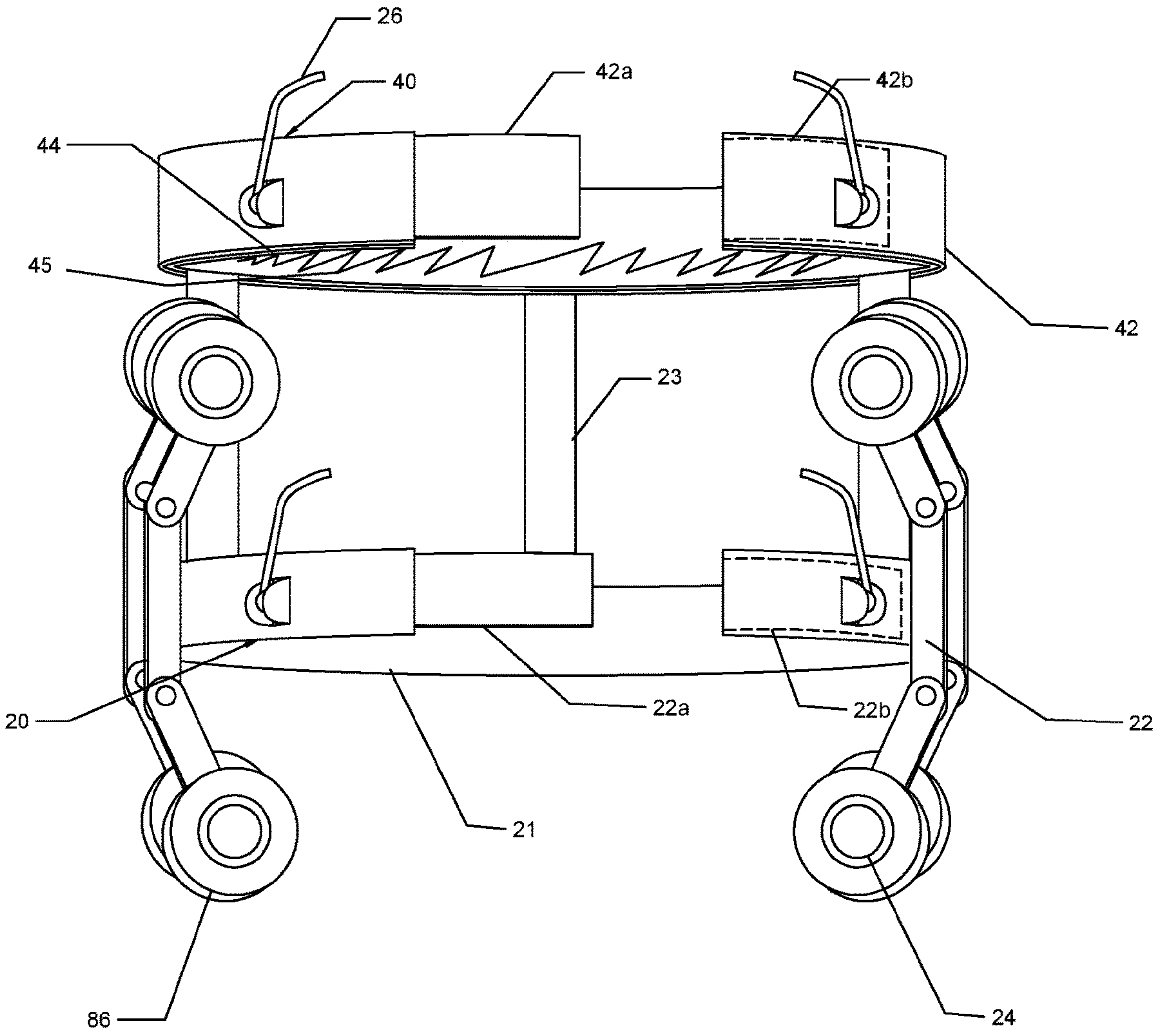
FIG. 7 shows a perspective view of the present invention according to an embodiment thereof.

The climbing assembly 20 may include a climbing structure 22, wheels 24, hooks 26, a bottom ring 21 and connecting elements 23. As best illustrated in FIG. 2 the bottom ring 21 may have a circular shape. The bottom ring 21 may be made of a light and strong material including but not limited to graphene, carbon-reinforced nylon, aluminum, fiberglass, or any other suitable material. The bottom ring 21 may have and anti-rust layer. As best shown in FIG. 7 the bottom ring 21 may be suitable to be open. The closing element **22*a* may be fitted into the insertion element 22*b* to close the bottom ring 21. The bottom ring 21 may be closed defining predetermined circumferences. The bottom ring 21 may be open to fit around the trunk of a tree and then closed to tightly surround the trunk of the tree. The outer sides of the bottom ring 21 may have climbing structures 22 and hooks 26**.

The climbing structures 22 may be fixed in the lateral sides of the bottom ring 21. The climbing structures 22 may be made of a light and strong material including but not limited to graphene, carbon-reinforced nylon, aluminum, fiberglass, or any other suitable material. The climbing structures 22 may have an anti-rust layer. The climbing structures 22 may be at least two climbing structures 22. The climbing structures 22 may have a bottom portion, a central portion and a top portion. The central portion of the climbing structures 22 may be in a vertical position with respect to the bottom ring 21. The top portion and bottom portion of the climbing structures 22 may move towards the center and outward the center of the bottom ring 21, depending on a thickness of the three. The top and bottom portion of the climbing structures 22 may have distal ends. The distal ends of the top and bottom portion of the climbing structures 22 may have wheels 24. In a preferred embodiment the climbing structures 22 may move through the control device assembly 80.

The wheels 24 may have a circular shape. The wheels 24 may be made of aluminum, carbon fibers, rubber, or any other suitable material. The bottom and top portion of the climbing structures 22 may move to press the wheels 24 to the trunk of the tree. The wheels 24 may rotate to move the climbing assembly 20 up and down on the trunk of the tree. The climbing structures 22 may be automatically adjustable to a predetermined diameter. It also may be suitable for the climbing structures 22 to be manually adjusted. The wheels 24 may have brakes to fix the climbing assembly 20 in a predetermined position in the trunk of the tree. It should be understood that bearings 25 may be used to reduce rotational friction and support axial loads. The bearings 25 may be ball bearing. The bearings 25 may be into the wheel 24 in a preferred embodiment two wheels 24 may be attached to the lateral sides of the bottom portion of the climbing structures 22 and another two wheels 24 may be attached to the lateral side of the top portion of the climbing structures 22. The wheels 24 may be attached to the climbing structures 22 through the shaft 25. The shaft 25 may be rotated through a motor. The shaft 25 may be rotated to move up or down the bottom ring 21. The wheels 24 may be in such a configuration that allows fixing the present invention in a predetermined position in the palm tree.

The hooks 26 may be rotate downwards and outwards to the center of the bottom ring 21. The hook 26 may be moved to secure the bottom ring 21 to the trunk of the tree. The connecting elements 23 may be located on an uppermost end of the bottom ring. The connecting elements 23 may connect and allow rotation of the cutting assembly 40. The connecting elements 23 may be made of metal, plastic, or any other resistant material. It should be understood that the climbing assembly 20 may include a plurality of electronic elements such as motor and actuators to provide the aforedescribed movements for the climbing structures 24 and the closing element **22*a*. The electronic elements of the climbing assembly 20** may be waterproof.

The cutting assembly 40 may include a top ring 42, a channel 44 and a cutting element 45. The top ring 42 may have a circular shape. The top ring 42 may be made of a light and strong material including but not limited to graphene, carbon-reinforced nylon, aluminum, fiberglass, or any other suitable material. As best illustrated in FIG. 7 the top ring 42 may be suitable to be open. The closing element **42*a* may be fitted into the insertion element 42*b* to close the top ring 42. The top ring 42 may be closed defining predetermined circumferences. The top ring 42 may be open to fit around the trunk of a tree and then closed to tightly surround the trunk of the tree. In a preferred embodiment the top ring 42 may be open and closed through the control device assembly 80. It also may be suitable for the top ring 42** to be open and closed through an automatized system.

The channel 44 may be located on a bottommost end of the top ring 42. The connecting elements 23 may be inserted into the channel 44. The top ring 42 may rotate with respect to the bottom ring 21 by rotating the top ring 42 over the connecting elements 23 through the channel 44. The closing element **42*a* may be suitable to receive the connecting elements 23. Thus, the connecting elements 23 may slide through the channel 44 of the top ring 42 and through the bottommost end of the closing element 42*a*. The connecting elements 23 may have wheels or any other means that allows the movement of the top ring 42 through the channels 44**.

The cutting element 45 may be located on the inner side of the top ring 42. The cutting element 45 may be a dented element that surround the inner side of the top ring 42. The cutting element 45 may be suitable to trim slag of the trunk of the tree. The cutting element 45 may rotate to cut the slag of the tree. In a preferred embodiment the cutting element 45 may rotate along with the rotation of the top ring 42. In yet another embodiment the cutting element 45 may rotate with respect to the top ring 42. The cutting element 45 may be made of metal or any other suitable material.

The electronic assembly 60 may include a housing 62, a motor 64, a battery 66, a receiver 68, a microcontroller 61 and a cord 63. The housing 62 may be made of metal, plastic, or any other suitable material. The housing 62 may be connected to the bottom ring 21 by means of the cord 63. The cord 63 may have a covering. The covering of the cord 63 may be made of plastic, fiberglass, metal, or any other suitable material. The covering of the cord 63 may be used to protect the wires inside of the cord 63. The cord 63 may be a power cord spiral spring. The cord 63 may be waterproof. The housing 62 may have a rectangular shape. The motor 64, the battery 66 and the receiver 68 may be inside of the housing 62. The motor 64 may be an induction motor, an AC brushless motor or any other motor known in the prior art. The motor 64 may use fuel or electricity to operate. In a preferred embodiment the motor 64 is operated to provide power to the electronic assembly.

The microcontroller 61 may control the movement of the climbing structures 22 and the rotation of the top ring 42. The microcontroller 61 may be connected to the receiver 68. The receiver 68 may receive instructions from the control device assembly 80. It should be understood that the present invention 10 may include a plurality of motors and circuits to be functional. The battery 66 may provide power to the electronic assembly 60. In a preferred embodiment the battery 66 is a backup battery for the motor 64. The battery 66 may be a rechargeable battery. The battery 66 may be any type of battery known in the prior art. It also may be suitable for the electronic assembly 60 to be connected to the power supply.

The control device assembly 80 may include a control housing 82, a control battery 85, a microcontroller 83, a transmitter 81 and buttons 84. The control housing 82 may have a rectangular shape, a circular shape, or any other suitable shape. The control housing 82 may be made of plastic, metal, or any other suitable material. The control housing 82 may have buttons 84. The buttons 84 may be used to operate the climbing assembly 20 to move up or down in the trunk of the tree. The buttons 84 may be operated to rotate the cutting assembly 40. It also may be suitable to operate the speed of rotation of the cutting element 45 through the buttons 84. In a preferred embodiment one of the buttons 84 is depressed to adjust the diameter of the bottom ring 21, the diameter of the top ring 42 and the climbing elements 22. Another of the buttons 26 may be depressed to operate the wheels 24 to move the bottom ring up or down in the trunk of a tree. Yet another of the buttons 84 may be depressed to control the speed of rotation of the cutting element 45. The buttons 84 may be located on a front portion of the control housing 82. The buttons 84 may actuate the microcontroller 83.

The microcontroller 83, the transmitter 81 and the control battery 85 may be located inside the control housing 82. The microcontroller 83 may be connected to the buttons 84. The buttons 84 may transmit the function defined by the user when depressing one of the buttons 84 to the microcontroller 83. The microcontroller 83 may be connected to the transmitter 81. The microcontroller 83 may actuate the transmitter 81 to transmit a predetermined instruction to the receiver 68. The receiver 68 may receive the predetermined instruction and send it to the microcontroller 61. The microcontroller 61 may actuate the climbing structures 22, wheels 24 or cutting element 45. The cutting element 45 may be speed-controlled. In a preferred embodiment a user may place the bottom ring 21 and the top ring 42 surrounding a bottom portion of the trunk of a tree and then use the buttons 84 to operate the climbing structures 22 to make the bottom ring 21 climb along with the top ring 42. The user may operate the cutting assembly 40 to cut the slag in the upper portion of the trunk of a tree. In a preferred embodiment the tree is a palm tree.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A remote-controlled tree trimmer, comprising:

a climbing assembly, wherein said climbing assembly includes a bottom ring and climbing structures, wherein said climbing structures are located in an outer side of said bottom ring, said climbing structures are adapted to move said bottom ring up and down along a trunk of a tree;

a cutting assembly, wherein said cutting assembly includes a top ring and a cutting element, wherein said top ring is connected to said bottom ring, wherein said cutting element is in an inner portion of said top ring, said cutting element is configured to trim slag of said trunk of said tree;

a control device assembly, wherein said control device assembly includes a control device, said control device is adapted to operate said cutting assembly and said climbing assembly; and wherein said climbing assembly includes hooks, said hooks are adapted to attach said bottom ring and said top ring in a predetermined position in said trunk of said tree, wherein said hooks rotate downwards and outwards to a center of the bottom ring.

2. The remote-controlled tree trimmer set forth in claim 1, further comprising a motor to operate the remote-controlled tree trimmer.

3. The remote-controlled tree trimmer set forth in claim 1, wherein said tree trimer includes a motor connected to said bottom ring, said motor provides power to said climbing assembly and said cutting assembly.

4. The remote-controlled tree trimmer set forth in claim 1, wherein said wheels include brakes to fix said bottom ring and said top ring in a predetermined position.

5. The remote-controlled tree trimmer set forth in claim 1, wherein said cutting elements are replaceable cutting elements.

6. A remote-controlled tree trimmer, comprising:

a climbing assembly, wherein said climbing assembly includes a bottom ring, hooks and climbing structures, wherein said climbing structures are located in an outer side of said bottom ring, said climbing structures are adapted to move said bottom ring up and down along a trunk of a tree, said climbing structures include wheels, when mounted, said wheels press against said trunk of said tree, said wheels rotate to move up and down said bottom ring, said hooks attach said bottom ring to said trunk of said tree, wherein said hooks rotate downwards and outwards to a center of the bottom ring;

a cutting assembly, wherein said cutting assembly includes a top ring and a cutting element, wherein said top ring is connected to said bottom ring, wherein said cutting element is in an inner portion of said top ring, said cutting element trims slag of said trunk of said tree, said bottom ring, said cutting element and said top ring are configured to be opened, said bottom ring and said top ring are adjustable in diameter;

an electronic assembly, wherein said electronic assembly includes a motor wherein said motor provides power to said climbing assembly and said cutting assembly; and a control device assembly, wherein said control device assembly includes a control device, said control device is adapted to operate said cutting assembly and said climbing assembly.

* * * * *